US011868064B2

(12) United States Patent
Sakaya et al.

(10) Patent No.: US 11,868,064 B2
(45) Date of Patent: Jan. 9, 2024

(54) IMAGE FORMING APPARATUS WITH A TONER CONVEYING DEVICE HAVING A REVERSE-FLOW CONVEYING PORTION

(71) Applicants: Kohta Sakaya, Kanagawa (JP); Yasunobu Shimizu, Kanagawa (JP); Shintaro Yamada, Tokyo (JP)

(72) Inventors: Kohta Sakaya, Kanagawa (JP); Yasunobu Shimizu, Kanagawa (JP); Shintaro Yamada, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/743,447

(22) Filed: May 13, 2022

(65) Prior Publication Data

US 2022/0373934 A1 Nov. 24, 2022

(30) Foreign Application Priority Data

May 19, 2021 (JP) ................................. 2021-084499

(51) Int. Cl.

*G03G 21/10* (2006.01)
*G03G 21/12* (2006.01)
*G03G 15/08* (2006.01)

(52) U.S. Cl.

CPC ....... *G03G 15/0891* (2013.01); *G03G 21/105* (2013.01); *G03G 21/12* (2013.01); *G03G 2221/1624* (2013.01)

(58) Field of Classification Search

CPC .. G03G 15/0891; G03G 21/105; G03G 21/12; G03G 21/10; G03G 2221/1621; G03G 2221/1624; G03G 15/0868; G03G 2215/0685

See application file for complete search history.

(56) References Cited

U.S. PATENT DOCUMENTS

2010/0239340 A1* 9/2010 Akaike ................ G03G 21/105 399/358
2015/0346638 A1* 12/2015 Mizusawa .......... G03G 15/0891 399/358
2016/0154341 A1* 6/2016 Hamada ............. G03G 15/0891 399/358
2019/0018343 A1* 1/2019 Oshikawa .......... G03G 15/0865
2020/0174399 A1* 6/2020 Ohkubo ............. G03G 21/1814
2022/0091556 A1 3/2022 Shimizu et al.

FOREIGN PATENT DOCUMENTS

JP 2011-221452 11/2011
JP 2012-150187 8/2012
JP 2017-215545 12/2017
JP 2018-084709 5/2018

* cited by examiner

*Primary Examiner* — Arlene Heredia
*Assistant Examiner* — Laura Roth
(74) *Attorney, Agent, or Firm* — XSENSUS LLP

(57) ABSTRACT

A toner conveying device includes a toner conveying section and a toner conveyor. The toner conveying section includes a bent portion and an outlet port. The bent portion bends in a predetermined direction. The outlet port discharges toner. The toner conveyor is bendable and driven by a driving device to rotate to convey toner. The toner conveyor is disposed in the toner conveying section such that a first end of the toner conveyor is coupled to the driving device and a second end of the toner conveyor is a free end. The toner conveyor includes a reverse-flow conveying portion, between the outlet port and the free end, to convey the toner from the second end to the first end.

8 Claims, 4 Drawing Sheets

IMAGE FORMING APPARATUS WITH A TONER CONVEYING DEVICE HAVING A REVERSE-FLOW CONVEYING PORTION

CROSS-REFERENCE TO RELATED APPLICATION

This patent application is based on and claims priority pursuant to 35 U.S.C. § 119(a) to Japanese Patent Application No. 2021-084499, filed on May 19, 2021, in the Japan Patent Office, the entire disclosure of which is hereby incorporated by reference herein.

BACKGROUND

Technical Field

Embodiments of this disclosure relate to a toner conveying device to convey toner, a process cartridge including the toner conveying device, and an image forming apparatus that includes the toner conveying device or the process cartridge.

Related Art

In the related art, an image forming apparatus such as a copying machine, a printer, or a facsimile includes a bent portion (curved portion) bent in a predetermined direction in a toner conveying section (toner conveying pipe) in which toner such as waste toner is conveyed. A toner conveyor (toner conveying screw) that can be bent along the bent portion is disposed in the toner conveying section having such a bent portion. As the toner conveyor is driven to rotate by a driver, the toner is conveyed in the toner conveying section.

SUMMARY

In an embodiment of the present disclosure, there is provided a toner conveying device that includes a toner conveying section and a toner conveyor. The toner conveying section includes a bent portion and an outlet port. The bent portion bends in a predetermined direction. The outlet port discharges toner. The toner conveyor is bendable and driven by a driving device to rotate to convey toner. The toner conveyor is disposed in the toner conveying section such that a first end of the toner conveyor is coupled to the driving device and a second end of the toner conveyor is a free end. The toner conveyor includes a reverse-flow conveying portion, between the outlet port and the free end, to convey the toner from the second end to the first end.

In another embodiment of the present disclosure, there is provided a process cartridge that is detachably attachable to an apparatus body of an image forming apparatus. The process cartridge includes the toner conveying device, an image bearer, a developing device, a cleaning device, and a waste-toner collecting portion. The developing device develops a latent image on the image bearer to form a toner image. The cleaning device collects untransferred toner on the image bearer. The waste-toner collecting portion collects the untransferred toner collected by the cleaning device as waste toner. The toner conveying device conveys, as the waste toner, the untransferred toner collected by the cleaning device toward the waste-toner collecting portion.

In still another embodiment of the present disclosure, there is provided a process cartridge that is detachably attachable to an apparatus body of an image forming apparatus. The process cartridge includes the toner conveying device, an image bearer, a developing device, and a cleaning device. The developing device develops a latent image on the image bearer to form a toner image. The cleaning device collects untransferred toner on the image bearer. The toner conveying device conveys, as recycled toner, the untransferred toner collected by the cleaning device toward the developing device.

In still yet another embodiment of the present disclosure, there is provided an image forming apparatus that includes the toner conveying device.

In still yet further another embodiment of the present disclosure, there is provided an image forming apparatus that includes the process cartridge.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
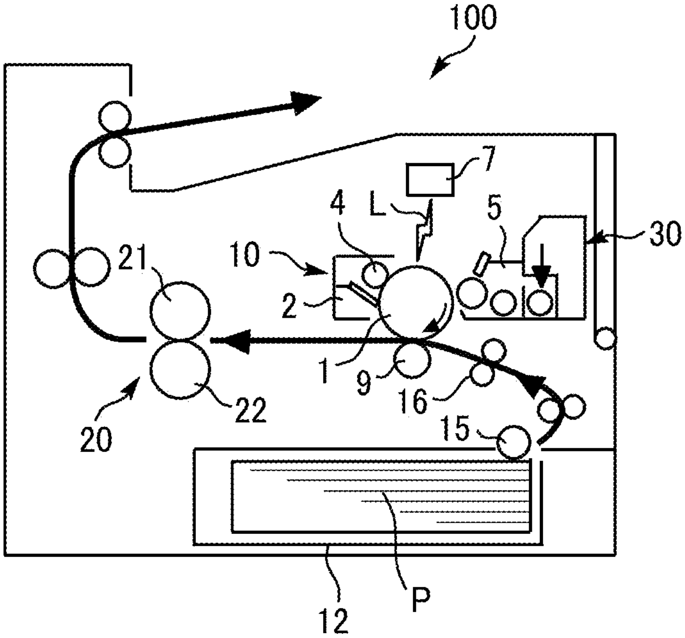
FIG. 1 is a diagram illustrating an overall configuration of an image forming apparatus according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

Note that identical reference numerals are assigned to identical components or equivalents and a redundant description of those components is simplified or omitted.

With reference to FIG. 1, a configuration and operation of an image forming apparatus 100 is described below. In FIG. 1, the image forming apparatus 100 that is a printer in the present embodiment includes a photoconductor drum 1 on which a toner image is formed, and an exposure device 7 (writing device) that irradiates the photoconductor drum 1 with exposure light L according to image data input from an input device such as a personal computer. The image forming apparatus 100 further includes a transfer roller 9 to transfer the toner image borne on a surface of the photoconductor drum 1 to a sheet P conveyed to a transfer nip (transfer position), a process cartridge 10 in which the photoconductor drum 1, a charging roller 4, a developing device 5, a cleaning device 2, and a toner conveying device 6 (see FIG. 2) are integrated, and a sheet feeder 12 (sheet tray) to stock the sheets P such as paper sheets.

The image forming apparatus 100 still further includes a registration roller pair 16 (a timing roller pair) to feed the sheet P toward the transfer nip where the photoconductor drum 1 contacts the transfer roller 9, a fixing device 20 to fix an unfixed image on the sheet P, and a toner container 30. The fixing device 20 includes a fixing roller 21 and a pressure roller 22.

The above-described image forming apparatus 100 includes the charging roller 4, the developing device 5, the cleaning device 2, and the toner conveying device 6 (waste-toner conveying device), around the photoconductor drum 1. These members (the photoconductor drum 1, the charging roller 4, the developing device 5, the cleaning device 2, and the toner conveying device 6) are integrated as the process cartridge 10 and are detachably (replaceably) attached to an apparatus body of the image forming apparatus 100. The process cartridge 10 is replaced with a new process cartridge in a certain replacement cycle. The toner container 30 is attached above the process cartridge 10 (developing device 5). The toner container 30 is detachably (replaceably) attachable to the apparatus body of the image forming apparatus 100. The toner container 30 (a toner storage 31) stores toner (fresh toner). The toner is appropriately supplied from the toner container 30 to the inside of the developing device 5. When the toner stored in the toner container 30 is depleted (or the toner stored in the developing device 5 is depleted), the toner container 30 is replaced with a new toner container. Note that the toner container 30 according to the present embodiment further includes a waste-toner collecting portion 32 to collect waste toner in addition to the toner storage 31 that stores fresh toner. The waste-toner collecting portion 32 collects, as waste toner, untransferred toner collected by the cleaning device 2.

Figure 2:
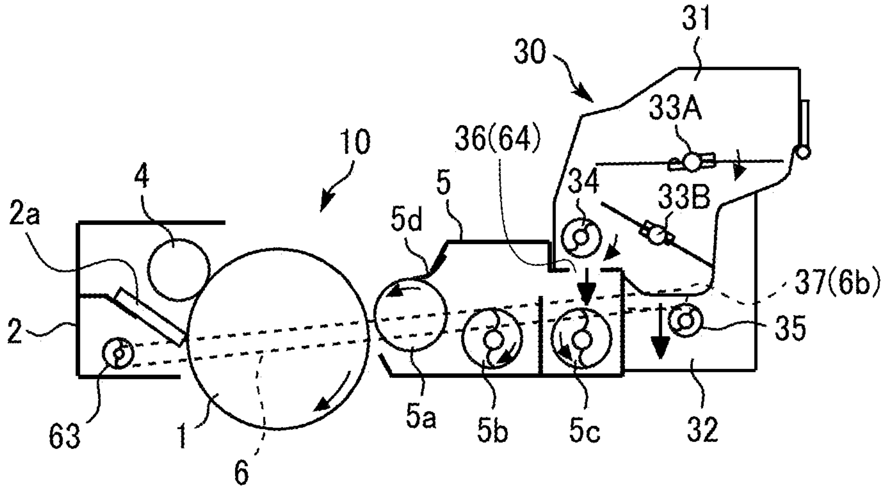
FIG. 2 is a schematic view of a process cartridge.

Now, a description is given of a basic image forming operation performed by the image forming apparatus 100 with reference to FIGS. 1 and 2. With reference to FIG. 1, as image data is transmitted from the input device, such as a personal computer, to the exposure device 7 in the image forming apparatus 100, the exposure device 7 irradiates the surface of the photoconductor drum 1 with exposure light (laser beam) L according to the image data. Meanwhile, the photoconductor drum 1 rotates in a direction indicated by an arrow (clockwise) in FIG. 1. First, the charging roller 4 uniformly charges the surface of the photoconductor drum 1 at a position at which the surface of the photoconductor drum 1 faces the charging roller 4 (in a charging process). As a result, a charging potential is formed on the surface of the photoconductor drum 1. In the present embodiment, the charging potential on the photoconductor drum 1 is approximately −900 V. The charged surface of the photoconductor drum 1 thereafter reaches an irradiation position of the exposure light L. An irradiated portion of the photoconductor drum 1 irradiated with the exposure light L has a latent image potential (from about 0 V to −100 V), and thus an electrostatic latent image is formed on the surface of the photoconductor drum 1 (in an exposure process).

The surface of the photoconductor drum 1 bearing the electrostatic latent image thereon then rotates until the surface of the photoconductor drum 1 reaches a position opposite the developing device 5. The developing device 5 supplies toner onto the photoconductor drum 1, thereby developing the latent image formed on the photoconductor drum 1 into the toner image (in a developing process). As illustrated in FIG. 2, the developing device 5 includes a developing roller 5*a*, two conveying screws 5*b* and 5*c*, and a doctor blade 5*d*. The developing device 5 contains toner, that is, one-component developer. In accordance with the consumption of the toner in the developing device 5, the toner is supplied from a discharge port 36 of the toner container 30 (toner storage 31) into the developing device 5 through a supply port 64 of the developing device 5. The two conveying screws 5*b* and 5*c* stir and mix the supplied toner together with the toner contained in the developing device 5 while circulating the toner in a longitudinal direction of the developing device 5, which is a direction perpendicular to the surface of the plane on which FIG. 2 is illustrated. The developing roller 5*a* scoops up part of the toner conveyed by the conveying screw 5*b*. The toner scooped up by the developing roller 5*a* is regulated by the doctor blade 5*d* and reaches a position (development area) opposite the photoconductor drum 1. At this time, the toner on the developing roller 5*a* is rubbed by the doctor blade 5*d* and triboelectrically charged. The toner adheres to the electrostatic latent image on the photoconductor drum 1 at the development area. The toner image is thus formed on the photoconductor drum 1. The developing roller 5*a* and the two conveying screws 5*b* and 5*c* are driven to rotate by a drive motor disposed in the apparatus body of the image forming apparatus 100 in the respective directions indicated by arrows in FIG. 2.

After the developing process, the surface of the photoconductor drum 1 bearing the toner image thereon reaches the transfer nip (transfer position) between the photoconductor drum 1 and the transfer roller 9. In the transfer nip between the photoconductor drum 1 and the transfer roller 9, a transfer bias having a polarity opposite a polarity of the toner is applied from a power source to the transfer roller 9, thereby transferring the toner image formed on the photoconductor drum 1 onto the sheet P conveyed by the registration roller pair 16 (in a transfer process).

The surface of the photoconductor drum 1 after the transfer process reaches a position opposite the cleaning device 2. At this position, untransferred toner remaining on the surface of the photoconductor drum 1 is mechanically removed by a cleaning blade 2*a* and collected in the cleaning device 2 (in a cleaning process). A series of image forming processes on the photoconductor drum 1 is thus completed. The untransferred toner collected in the cleaning device 2 is conveyed by a toner conveying screw 63, which is disposed inside the cleaning device 2, to a first end in a width direction (axial direction) of the toner conveying screw 63 and is conveyed in an obliquely upper right direction in FIG. 2 by the toner conveying device 6 (see FIG. 3). Thereafter, the untransferred toner is collected as waste toner from an outlet port 6*b* of the toner conveying device 6 to the inside of the toner container 30 (waste-toner collecting portion 32) via a collection port 37 of the toner container 30. In the new toner container 30, the toner storage 31 is filled with fresh toner, and the waste-toner collecting portion 32 is empty.

The toner storage 31 includes a supply roller 34 and stirrers 33A and 33B. The supply roller 34 supplies new toner in the toner storage 31 to the developing device 5. The stirrers 33A and 33B stir the new toner in the toner storage 31. A stirrer 35 is disposed in the waste-toner collecting portion 32 to stir the waste toner in the waste-toner collecting portion 32.

The sheet P is conveyed to the transfer nip (transfer position) between the photoconductor drum 1 and the transfer roller 9 as follows. First, a feed roller 15 feeds the uppermost sheet P of the stack of sheets P stored in the sheet feeder 12 toward a conveyance passage. Thereafter, the sheet P reaches the registration roller pair 16. The sheet P that has reached the registration roller pair 16 is conveyed to the transfer nip (the contact position of the transfer roller 9 with the photoconductor drum 1) in synchronization with an entry of the toner image formed on the photoconductor drum 1 into the transfer nip.

After the transfer process, the sheet P passes through the transfer nip (the position of the transfer roller 9) and reaches the fixing device 20 through the conveyance passage. In the fixing device 20, the sheet P is interposed between the fixing roller 21 and the pressure roller 22. The toner image is fixed on the sheet P by heat applied from the fixing roller 21 and pressure applied from both of the fixing roller 21 and the pressure roller 22. The sheet P having the fixed toner image thereon is discharged from a fixing nip between the fixing roller 21 and the pressure roller 22, ejected from the apparatus body of the image forming apparatus 100, and rests on an output tray. Thus, a series of the image forming processes is completed.

Figure 3:
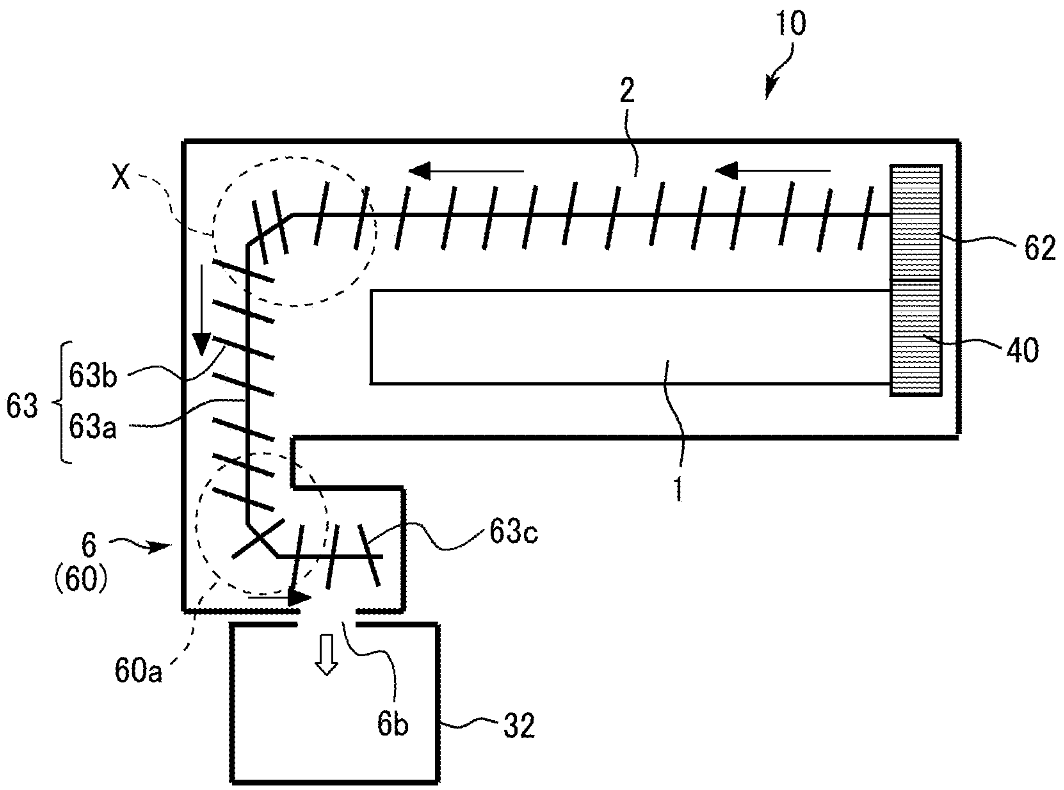
FIG. 3 is a schematic view of a toner conveying device in the process cartridge.

The configuration and operation of the toner conveying device 6 according to the present embodiment are described in further detail below. As illustrated in FIGS. 3 to 4B, in the toner conveying device 6, the toner conveying screw 63 serving as a toner conveyor is rotatably disposed in a tubular toner conveying section 60 (conveyance passage). As described above with reference to FIG. 2, the toner conveying device 6 conveys the untransferred toner (toner) collected by the cleaning device 2 toward the waste-toner collecting portion 32 as waste toner. In the present embodiment, the toner conveying screw 63 is disposed in an area from the inside of the cleaning device 2 to the most downstream portion (a portion where the outlet port 6*b* is disposed) of the toner conveying section 60. In other words, the toner conveying screw 63 conveys the toner (untransferred toner) collected in the cleaning device 2 toward the outlet port 6*b* in a direction indicated by arrows in FIG. 3.

Specifically, the toner collected in the cleaning device 2 is conveyed by the toner conveying screw 63 that rotates in a predetermined direction and flows into the toner conveying section 60. The toner that has flowed into the toner conveying section 60 is conveyed along the conveyance passage by the toner conveying screw 63 that rotates in the predetermined direction and is discharged from the outlet port 6*b* in a direction indicated by a white arrow in FIG. 3. The toner that has flowed from the outlet port 6*b* is collected as waste toner in the waste-toner collecting portion 32.

In the present embodiment, a bent portion 60*a* that is bent in a predetermined direction is formed in the toner conveying section 60. In particular, in the present embodiment, an upstream conveyance passage from the bent portion 60*a* and a downstream conveyance passage from the bent portion 60*a* are substantially orthogonal to each other at the bent portion 60*a*. Further, in the present embodiment, the cleaning device 2 and the toner conveying section 60 are also substantially orthogonal to each other at a joint X. In the present embodiment, a case of the toner conveying section 60 (toner conveying device 6) also functions as a part of the housing of the process cartridge 10. An upstream portion of the toner conveying section 60 communicates with the cleaning device 2. A downstream portion of the toner conveying section 60 has the outlet port 6*b* for discharging the toner toward the waste-toner collecting portion 32.

With reference to FIG. 3, the toner conveying screw 63 as the toner conveyor is disposed in the toner conveying section 60 such that the first end (driving side where a gear 62 that meshes with a drum gear 40 of the photoconductor drum 1 is disposed) of the toner conveying screw 63 is coupled to a driver (driving motor for rotationally driving the photoconductor drum 1). A second end (non-driving side where the outlet port 6*b* is formed) of the toner conveying screw 63 is a free end. The toner conveying screw 63 is made of a flexible material such as a resin material and is bendable. For this reason, the toner conveying screw 63 can be rotated while being bent along the shape of the bent portion 60*a* or the joint X described above. In this manner, the non-driving side of the toner conveying screw 63 is set to be the free end. For this reason, even when the toner conveying screw 63 is driven to rotate so as to be bent at the bent portion 60*a* (and the joint X), a large internal stress is less likely to be generated in the bent portion. Accordingly, the toner conveying screw 63 is less likely to be damaged and smoothly rotates.

Figure 4A:
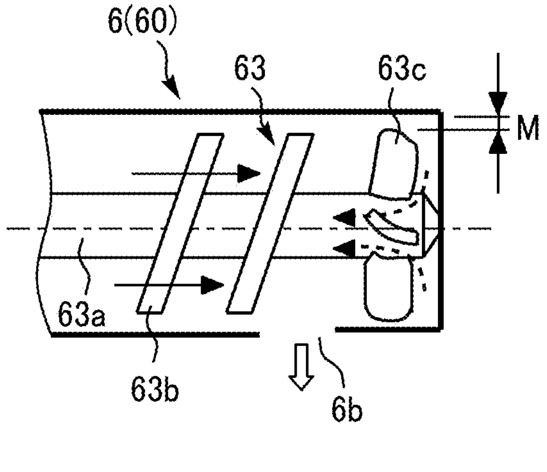
FIG. 4A is a cross-sectional view of a main part of the toner conveying device.
Figure 4B:
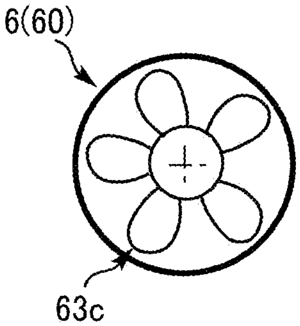
FIG. 4B is a cross-sectional view of a reverse-flow conveying portion in the toner conveying device.

In the present embodiment, as illustrated in FIG. 4A, the free end (end portion of a shaft 63*a*) of the toner conveying screw 63 is formed in a conical shape and is lightly fitted into a mortar-shaped fitting portion formed on an inner surface of the toner conveying section 60. For this reason, a position of the free end of the toner conveying screw 63 in the toner conveying section 60 is easily determined.

The toner conveying section 60 has the outlet port 6*b* at a position adjacent to the free end (end on the non-driving side) of the toner conveying screw 63 (toner conveyor) and upstream from the free end in a conveying direction in which the toner is conveyed to discharge the toner conveyed by the toner conveying screw 63 from the first end (upstream in the conveyance direction) toward the second end (downstream in the conveyance direction). The toner conveying screw 63 is driven to rotate by the driver to convey the toner. Specifically, as the toner conveying screw 63 is rotated by the photoconductor drum 1 driven to rotate by the drive motor, the toner is conveyed from the cleaning device 2 toward the outlet port 6*b*. The toner conveyed in the manner described above is discharged from the outlet port 6*b* by its own weight and collected in the waste-toner collecting portion 32. FIG. 3 illustrates the relative positions of the waste-toner collecting portion 32 and the process cartridge 10 in the vertical direction differently from the actual relative positions to facilitate understanding of the flow of toner in the process cartridge 10.

With reference to FIGS. 3, 4A, and 4B, in the present embodiment, the toner conveying screw 63 (toner conveyor) has a reverse-flow conveying portion 63*c* to convey toner from the second end to the first end (leftward in FIG. 4A) between the outlet port 6*b* and the free end (right end of the toner conveying screw 63 in FIG. 4A).

Specifically, the toner conveying screw 63 mainly includes the shaft 63*a*, a screw 63*b*, and the reverse-flow conveying portion 63*c*. The screw 63*b* is wound around the shaft 63*a* between the first end (upstream in the conveyance direction) and the outlet port 6*b*. In the present embodiment, the screw 63_b_ is spirally wound on the shaft 63_a_ at a predetermined pitch (screw pitch). The outer circumferential diameter (screw diameter) of the screw 63_b_ is slightly smaller than the inner circumferential diameter (inner circumferential diameter of the inner surface) of the toner conveying section 60. The reverse-flow conveying portion 63_c_ is formed between the outlet port 6_b_ and the free end (right end in FIG. 4A) of the shaft 63_a_. In the present embodiment, as illustrated in FIG. 4B, the reverse-flow conveying portion 63_c_ is a propeller-shaped portion that is inclined so as to generate an axial flow from the second end toward the first end with the rotation of the toner conveying screw 63.

More specifically, the reverse-flow conveying portion 63_c_ has a propeller shape (or a fan-blade shape). When the toner conveying screw 63 is driven to rotate, the toner located downstream from the toner conveying section 60 in the conveying direction is conveyed in a direction indicated by dashed-line arrows in FIG. 4A by the reverse-flow conveying portion 63_c_. The toner thus conveyed in a reverse direction, which is a direction opposite the conveying direction in which the toner is conveyed by the screw 63_b_ and is a conveying direction leftward in FIG. 4A, by the reverse-flow conveying portion 63_c_ is discharged from the outlet port 6_b_ and collected in the waste-toner collecting portion 32.

Figure 5:
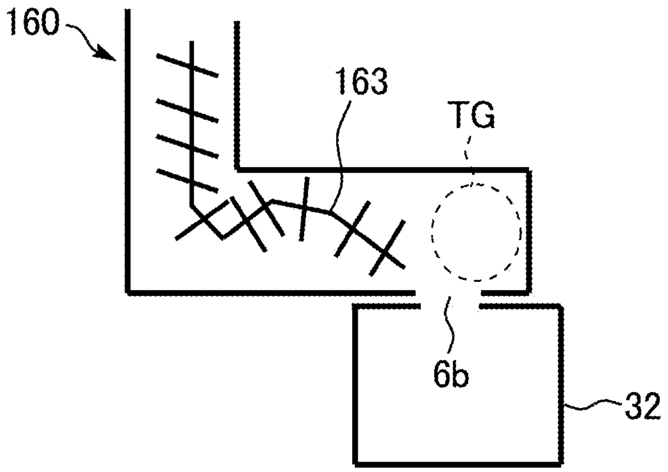
FIG. 5 is a view of a toner conveying screw deformed.

As described above, in the present embodiment, since the reverse-flow conveying portion 63_c_ is disposed in a vicinity of the free end of the toner conveying screw 63, the toner is less likely to be accumulated and aggregated in the vicinity of the free end of the toner conveying screw 63. Specifically, as in a toner conveying device 160 as a comparative example illustrated in FIG. 5, in a case in which a reverse-flow conveying portion 63_c_ is not disposed in a vicinity of a free end of a toner conveying screw 163, toner TG (a dashed circle in FIG. 5) is likely to be accumulated and aggregated in the vicinity of the free end. When the toner TG is accumulated and aggregated in the vicinity of the free end, the free end of the toner conveying screw 163 is easily deformed by the toner TG as illustrated in FIG. 5. When such deformation of the toner conveying screw 163 occurs, the toner conveying device 160 may not properly convey or discharge toner, or the toner conveying screw 163 may be damaged. In contrast, in the present embodiment, even if the toner is about to accumulate (stay) in the vicinity of the free end, the toner is conveyed in the reverse direction by the reverse-flow conveying portion 63_c_. Thus, such accumulation (stagnation) of the toner is less likely to occur, and the deformation of the toner conveying screw 63 is prevented.

With reference to FIG. 4A, in the present embodiment, a clearance M between the reverse-flow conveying portion 63_c_ of the toner conveying screw 63 and the inner surface of the toner conveying section 60 is set to from 0.2 mm to 0.6 mm. This is because a clearance M exceeding 0.6 mm may lower the conveyance performance of the reverse-flow conveying portion 63_c_ and hardly eliminate the stagnation. If the clearance M does not reach 0.2 mm, the reverse-flow conveying portion 63_c_ may interfere with the inner surface.

First Modification

Figure 6A:
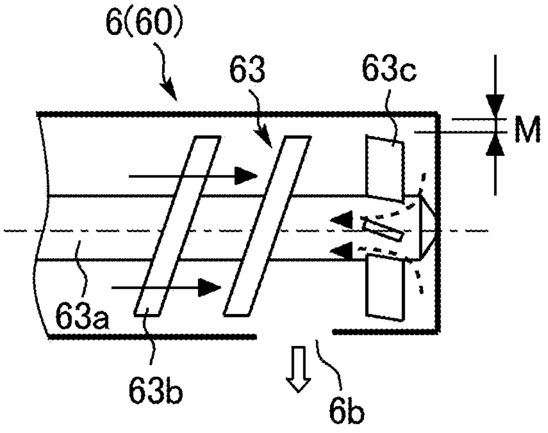
FIG. 6A is a cross-sectional view of a main part of a toner conveying device according to a first modification.
Figure 6B:
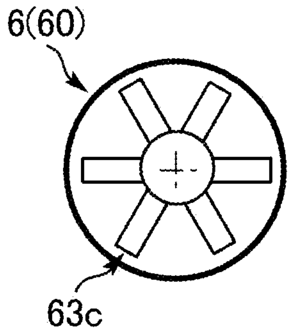
FIG. 6B is a cross-sectional view of a reverse-flow conveying portion in the toner conveying device according to the first modification.

As illustrated in FIGS. 6A and 6B, in a first modification, the reverse-flow conveying portion 63_c_ of the toner conveying screw 63 has a paddle-shaped portion inclined so as to generate the axial flow from the second end toward the first end (leftward in FIG. 6A) as the toner conveying screw 63 rotates. Specifically, the reverse-flow conveying portion 63_c_ has an inclined paddle shape. When the toner conveying screw 63 is driven to rotate, the toner located downstream from the toner conveying section 60 in the conveying direction is conveyed in the direction indicated by dashed-line arrows in FIG. 6A by the reverse-flow conveying portion 63_c_. The toner thus conveyed in the reverse direction, which is the direction opposite the conveying direction in which the toner is conveyed by the screw 63_b_ and is the conveying direction leftward in FIG. 6A, by the reverse-flow conveying portion 63_c_ is discharged from the outlet port 6_b_ and collected in the waste-toner collecting portion 32. In the process cartridge 10 as described above, the toner is less likely to be accumulated and aggregated in the vicinity of the free end of the toner conveying screw 63.

Second Modification

Figure 7:
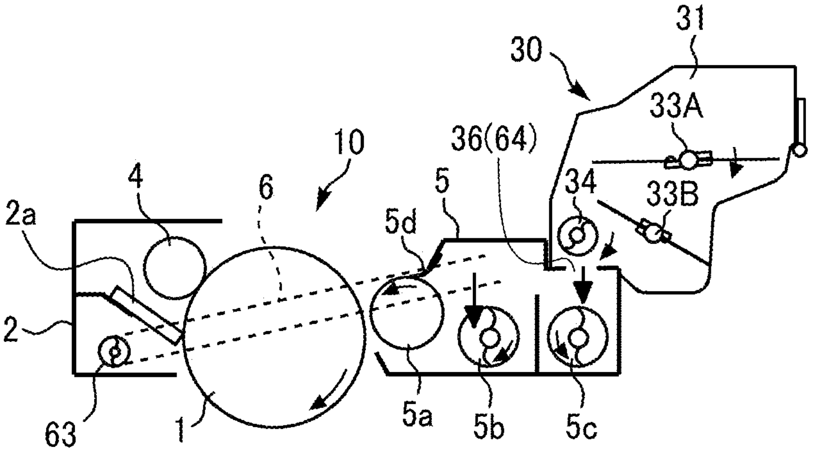
FIG. 7 is a schematic view of a process cartridge according to a second modification.

As illustrated in FIG. 7, in a second modification, the process cartridge 10 (toner container 30) does not include the waste-toner collecting portion 32. The untransferred toner collected by the cleaning device 2 is supplied to the developing device 5 as recycled toner. The toner conveying device 6 according to the second modification conveys the untransferred toner collected by the cleaning device 2 toward the developing device 5 as recycled toner. Further, the toner conveying device 6 is formed similarly to that illustrated in FIGS. 4A and 4B (or FIGS. 6A and 6B). In the process cartridge 10 as described above, the toner is less likely to be accumulated and aggregated in the vicinity of the free end of the toner conveying screw 63.

Third Modification

Figure 8:
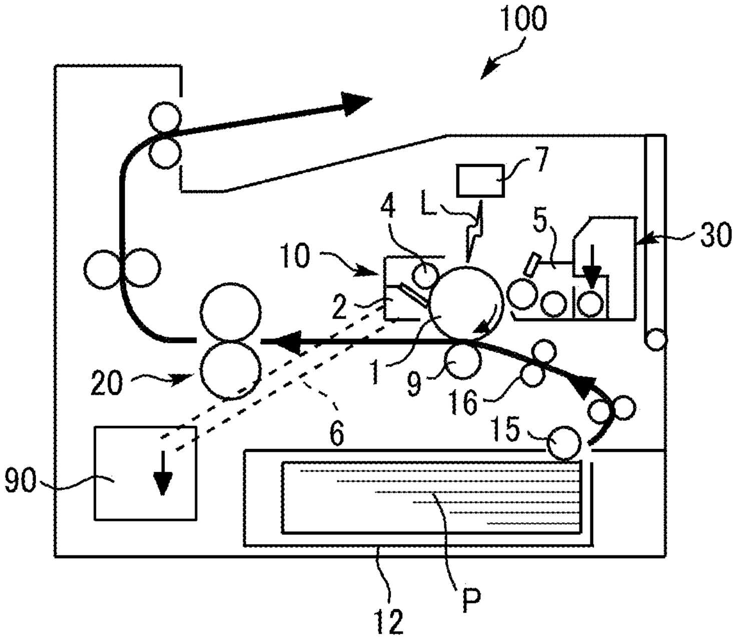
FIG. 8 is a schematic view of an image forming apparatus according to a third modification.

As illustrated in FIG. 8, in the image forming apparatus 100 according to a third modification, the process cartridge 10 (toner container 30) does not include the waste-toner collecting portion 32. Instead, a waste-toner container 90 for collecting, as waste toner, the untransferred toner collected by the cleaning device 2 is disposed outside the process cartridge 10 so as to be attachable to and detachable (replaceable) from the apparatus body of the image forming apparatus 100. The toner conveying device 6 according to the third modification conveys the untransferred toner collected by the cleaning device 2 toward the waste-toner container 90 as waste toner. Further, the toner conveying device 6 is formed similarly to that illustrated in FIGS. 4A and 4B (or FIGS. 6A and 6B). Also in the apparatus body of the image forming apparatus 100 as described above, the toner is less likely to be accumulated and aggregated in the vicinity of the free end of the toner conveying screw 63.

As described above, the toner conveying device 6 according to the present embodiment includes the toner conveying section 60 having the bent portion 60_a_ bent in a predetermined direction. The bendable toner conveying screw 63 (toner conveyor) is provided in the toner conveying section 60 such that the first end thereof is coupled to the driver and the second end thereof is the free end. The toner conveying screw 63 (toner conveyor) is driven to rotate by the driver and conveys the toner. The toner conveying section 60 has the outlet port 6_b_ at the position adjacent to the free end of the toner conveying screw 63 and upstream from the free end in the conveying direction to discharge the toner conveyed by the toner conveying screw 63 from the first end toward the second end. The toner conveying screw 63 has the reverse-flow conveying portion 63_c_ capable of conveying toner from the second end toward the first end between the outlet port 6_b_ and the free end. As a result, the toner is less likely to be accumulated and aggregated in the vicinity of the free end of the toner conveying screw 63.

In the present embodiment of the present disclosure, the process cartridge 10 as a single unit includes the photoconductor drum 1 (image bearer), the charging roller 4 (charging device), the developing device 5, the cleaning device 2, and the toner conveying device 6. However, the present disclosure is not limited to the embodiment described above. In another embodiment of the present disclosure, the individual devices (the photoconductor drum 1, the charging roller 4, the developing device 5, the cleaning device 2, and the toner conveying device 6) are detachably attached to the apparatus body of the image forming apparatus 100, independently from each other. Such a case provides substantially the same effects as the effects described above. Note that the term "process cartridge" used in the present disclosure means a unit that includes an image bearer united with at least one of a charging device to charge the image bearer, a developing device to develop a latent image on the image bearer, and a cleaning device to clean the image bearer, and that is removably attached to an apparatus body of an image forming apparatus.

In the above-described embodiments of the present disclosure, the toner conveying device 6 is included in the image forming apparatus 100 that performs monochrome image formation. Alternatively, the toner conveying device may be included in a color image forming apparatus. In the present embodiment, the toner conveying screw 63 is disposed in the area from the inside of the cleaning device 2 to the most downstream portion of the toner conveying section 60. In another embodiment, another conveyor may be disposed in the cleaning device 2 and the toner conveying screw 63 may be disposed in an area from the most upstream portion to the most downstream portion of the toner conveying section 60. Such cases attain advantageous effects equivalent to the above-described effects of the present embodiment.

In this specification, the term "bent" is defined that includes a shape bent at 90°, a shape bent at an angle other than 90°, and a shape that is not completely bent but is curved.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. A toner conveying device comprising:
a toner conveying section including:
a bent portion bending in a predetermined direction; and
an outlet port to discharge toner; and
a toner conveyor being bendable and driven by a driver including a driving motor to rotate to convey toner,
the toner conveyor disposed in the toner conveying section such that a first end of the toner conveyor is coupled to the driver and a second end of the toner conveyor is a free end,
the toner conveyor including a reverse-flow conveying portion, between the outlet port and the free end, to convey the toner from the second end to the first end, and
a clearance between the reverse-flow conveying portion and an inner surface of the toner conveying section is set to from 0.2 mm to 0.6 mm.

2. The toner conveying device according to claim 1,
wherein the toner conveyor is a toner conveying screw including:
a shaft;
a screw portion wound on the shaft from the first end to the outlet port; and
the reverse-flow conveying portion formed on the shaft from the outlet port to the free end.

3. The toner conveying device according to claim 2,
wherein the reverse-flow conveying portion is a propeller-shaped portion sloped to generate an axial flow of the toner from the second end toward the first end with rotation of the toner conveying screw.

4. The toner conveying device according to claim 2,
wherein the reverse-flow conveying portion is a paddle-shaped portion sloped to generate an axial flow of the toner from the second end toward the first end with rotation of the toner conveying screw.

5. A process cartridge detachably attachable to an apparatus body of an image forming apparatus, the process cartridge comprising:
the toner conveying device according to claim 1;
an image bearer;
a developing device including a developing roller to develop a latent image on the image bearer to form a toner image;
a cleaning device including a cleaning blade to collect untransferred toner on the image bearer; and
a waste-toner collecting portion including a toner container to collect the untransferred toner collected by the cleaning device as waste toner,
wherein the toner conveying device is configured to convey, as the waste toner, the untransferred toner collected by the cleaning device toward the waste-toner collecting portion.

6. A process cartridge detachably attachable to an apparatus body of an image forming apparatus, the process cartridge comprising:
the toner conveying device according to claim 1;
an image bearer;
a developing device including a developing roller to develop a latent image on the image bearer to form a toner image; and
a cleaning device including a cleaning blade to collect untransferred toner on the image bearer,
wherein the toner conveying device is configured to convey, as recycled toner, the untransferred toner collected by the cleaning device toward the developing device.

7. An image forming apparatus comprising the process cartridge according to claim 5.

8. An image forming apparatus comprising the toner conveying device according to claim 1.

* * * * *